Patented June 27, 1944

2,352,189

UNITED STATES PATENT OFFICE 2,352,189

2 - METHYL - 1,4-NAPHTHOHYDROQUINONE DERIVATIVES AND METHOD OF PREPARING THEM

Erhard Fernholz, Princeton, N. J., assignor to E. R. Squibb & Sons, New York, N. Y., a corporation of New York No Drawing. Application August 13, 1940, Serial No. 352,407

8 Claims. (Cl. 260—520)

This invention relates to, and has for its object the provision of: compounds of the general formula

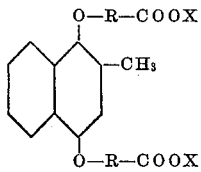

wherein R represents a divalent aliphatic group—preferably a lower-alkylene group—and X represents a member of the group consisting of H and cations forming water-soluble salts; and a method of preparing them. These compounds are useful for medicinal and other purposes; 2-methyl-1,4-naphthalene-dioxy diacetic acid, for example, exhibiting vitamin-K activity and hence being useful as an antihemorrhagic agent.

The compounds of this invention may be prepared by reacting 2-methyl-1,4-naphthohydroquinone with a halogen-substituted aliphatic carboxylic acid in the presence of an alkali. The reaction mixture is then subjected to conventional operations to obtain, and purify, the acid or salt thereof desired.

The utilizable halogen-substituted aliphatic carboxylic acids comprise, inter alia, halo-malonic acid, halo-acetic acid, and the halo-propionic, -butyric, -valeric, and -caproic acids. By selection of the corresponding neutralizing agents, a variety of water-soluble salts—inter alia, the alkali-metal and the ammonium—may be obtained.

The following example is illustrative of the invention: A solution of 13.8 g. sodium hydroxide in 350 ml. water is added to 15 g. 2-methyl-1,4-naphthohydroquinone and 16.3 g. monochloracetic acid, and the mixture is refluxed for 6 hours under nitrogen and allowed to stand about 16 hours. The reaction mixture is then diluted with an equal volume of water, and 10% hydrochloric acid added until an oil separates. The oil soon solidifies; and the solid (crude 2-methyl-1,4-naphthalene-dioxy diacetic acid) is removed by filtration and taken up in a 10% sodium carbonate solution. A decolorizing charcoal is then added, and the solution is warmed, filtered, and treated with dilute hydrochloric acid to reprecipitate the product; a pinkish powder, melting at 204–10° C., is thus obtained. The product is further purified by dissolving it in a 10% sodium bicarbonate solution, treating the solution three times with decolorizing charcoal, and reprecipitating from the almost colorless solution by adding dilute hydrochloric acid. The thus-obtained 2-methyl-1,4-naphthalene-dioxy diacetic acid is a white powder melting at 217-8° C.; the yield is 7.5 g. (30%).

The acid may be converted into the desired salt by neutralization; for example, the sodium salt may be obtained by careful neutralization with dilute sodium hydroxide and evaporating the water under reduced pressure.

The invention may be variously otherwise embodied within the scope of the appended claims.

I claim:

1. A compound of the general formula

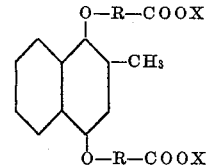

wherein R represents a member of the class consisting of lower-alkylene and carboxy-substituted lower-alkylene groups, and X represents a member of the group consisting of H and cations forming water-soluble salts.

2. A compound of the general formula

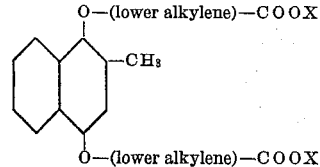

wherein X represents a member of the group consisting of H and cations forming water-soluble salts.

3. A compound of the general formula

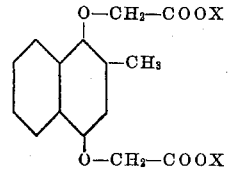

wherein X represents a member of the group consisting of H and cations forming water-soluble salts.

4. 2-methyl-1,4-naphthalene-dioxy diacetic acid.

5. A water-soluble salt of 2-methyl-1,4-naphthalene-dioxy diacetic acid.

6. The method of preparing a compound of the general formula

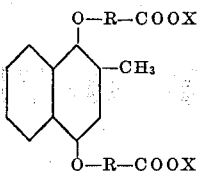

wherein R represents a member of the class consisting of lower-alkylene and carboxy-substituted lower-alkylene groups, and X represents a member of the group consisting of H and cations forming water-soluble salts, which comprises reacting 2-methyl-1,4-naphthohydroquinone with a compound of the formula halogen-R-COOH wherein R has the above-specified meaning, in the presence of an alkali.

7. The method of preparing a compound of the general formula

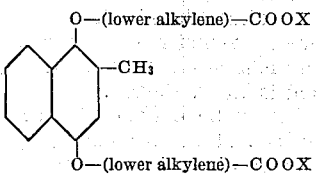

wherein X represents a member of the group consisting of H and cations forming water-soluble salts, which comprises reacting 2-methyl-1,4-naphthohydroquinone with a compound of the formula halogen-(lower alkylene)-COOH in the presence of an alkali.

8. The method of preparing a compound of the general formula

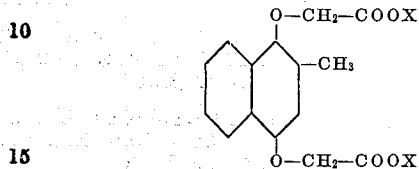

wherein X represents a member of the group consisting of H and cations forming water-soluble salts, which comprises reacting 2-methyl-1,4-naphthohydroquinone with a halo-acetic acid in the presence of an alkali.

ERHARD FERNHOLZ.